US009150262B2

(12) United States Patent
Son et al.

(10) Patent No.: US 9,150,262 B2
(45) Date of Patent: Oct. 6, 2015

(54) APPARATUS FOR VARIABLE SUPPORTING FOOT OF ROBOT

(71) Applicant: Hyundai Motor Company, Seoul (KR)

(72) Inventors: Young Jun Son, Guri-si (KR); Woo Sung Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 71 days.

(21) Appl. No.: 13/868,520

(22) Filed: Apr. 23, 2013

(65) Prior Publication Data

US 2014/0183320 A1    Jul. 3, 2014

(30) Foreign Application Priority Data

Dec. 27, 2012  (KR) .................. 10-2012-0154472

(51) Int. Cl.
*B62D 57/032*    (2006.01)
*F16H 1/04*    (2006.01)
*B25J 9/00*    (2006.01)

(52) U.S. Cl.
CPC ................. *B62D 57/032* (2013.01); *B25J 9/00* (2013.01); *B25J 9/003* (2013.01); *F16H 1/04* (2013.01)

(58) Field of Classification Search
USPC ............. 248/188.1, 688, 188.2, 188.5, 188.8, 248/188.91, 346.01, 677, 188; 74/109, 74/89.17, 89.16, 89.11, 89.12, 29, 30, 31, 74/33; 901/1
See application file for complete search history.

(56) References Cited

U.S. PATENT DOCUMENTS 6,116,984 A  *  9/2000  Munoz et al. ................. 446/310

FOREIGN PATENT DOCUMENTS

| JP | 2968420 | B2 | 10/1999 |
| JP | H11-320463 | A | 11/1999 |
| JP | 2002-219673 | A | 8/2002 |
| JP | 2005-212070 | A | 8/2005 |
| JP | 2006-51585 | A | 2/2006 |
| KR | 10-2012-0070009 | A | 6/2012 |
| WO | 2006-132330 | A1 | 12/2006 |

* cited by examiner

*Primary Examiner* — Nkeisha Smith
(74) *Attorney, Agent, or Firm* — McDermott Will & Emery LLP

(57) ABSTRACT

An apparatus for a variable supporting foot of a robot includes a guide groove formed in a foot module of the robot and having an open end. A support plate is disposed in the guide groove and can slide out of the open end of the guide groove. A power conversion unit has one end connected to the support plate. A power generation member is connected to the other end of the power conversion unit, and has a portion at a lower end thereof that extends lower than a lower surface of the foot module. The power generation member generates a driving force as the foot module approaches the ground. The driving force is converted into a rotational motion and is transmitted to the support plate by the power conversion unit to cause the support plate to slide out of the guide groove of the foot module.

8 Claims, 3 Drawing Sheets

APPARATUS FOR VARIABLE SUPPORTING FOOT OF ROBOT

CROSS-REFERENCE TO RELATED APPLICATION

This application claims the benefit under 35 U.S.C. §119(a) of Korean Patent Application No. 10-2012-0154472, filed Dec. 27, 2012, the entire contents of which are incorporated herein by reference.

BACKGROUND (a) Technical Field

The present invention relates to a foot of a robot, and more particularly, to an apparatus for a supporting foot of a robot which maintains stability of the robot by providing a foot module having an extendable surface area.

(b) Background Art

Technologies relating to walking with legs, including technologies for biped walking, are used in the development of walking robots and wearable robots. One of the key challenges of developing walking robots is to ensure the dynamic stability of the robots during walking.

Common methods of ensuring dynamic stability can prevent a robot from falling down, for example by designing a foot having a wide sole, but use of such a foot may interfere with walking behavior.

As another method, it is possible to sense a ZMP (Zero Moment Point) by mounting a force sensor on the sole of a robot foot, and to provide a stopper protruding from the foot and having an actuator. However, the force sensor and the actuator are expensive to provide and consume a large amount of power for operation. Additionally, the force sensor and actuator must respect various limits imposed on the design the foot module, including fitting within the layout constraints.

According to Korean Patent Publication No. 10-2012-0070009, titled "walking pattern of a biped robot", support members are provided that slide and move in accordance with the positions of the feet of the robot. The sliding and movement, however, can interfere with walking.

The description of related art provided above is geared to helping understand the background of the present invention, and should not be construed as necessarily relating to prior art.

SUMMARY OF THE DISCLOSURE

The present invention has been made in an effort to solve the problems of the related art described above, and an object of the present invention is to provide an apparatus for a supporting foot of a robot which maintains stability of the robot providing a foot module having an extendable surface area for supporting the robot.

In order to achieve the objects of the present invention, an apparatus for a variable supporting foot of a robot is provided. The apparatus includes: a guide groove formed in a foot module of a robot and having an open end; a support plate disposed in the guide groove and configured to slide out of the open end of the guide groove; a power conversion unit having one end connected to the support plate; and a power generation member connected to the other end of the power conversion unit. A portion of the power generation member located at a lower end thereof extends lower than a lower surface of the foot module and is configured to cause the power generation member to generate a driving force as the foot module approaches the ground. The driving force generated by the power generation member is converted into a rotational motion and is transmitted to the support plate by the power conversion unit to cause the support plate to slide out of the guide groove of the foot module.

The power conversion unit may include: a first rack gear formed on one side of the power generation member that is configured to move in a substantially vertical reciprocating motion; a first pinion gear engaged with the first rack gear and configured to convert the substantially vertical reciprocating motion of the power generation member into a rotational motion; a face gear engaged with the first pinion gear and configured to change an axis of the rotational motion to an axis perpendicular to the axis of the first pinion gear; a second pinion gear disposed coaxially with and rotationally connected to the face gear; and a second rack gear formed on one side of the support plate and configured to engage with the second pinion gear.

The power conversion unit may include: a first rack gear formed on one side of the power generation member that is configured to move in a substantially vertical reciprocating motion; a first pinion gear engaged with the first rack gear and configured to convert the substantially vertical reciprocating motion of the power generation member into a rotational motion; a second pinion gear disposed coaxially with and rotationally connected to the first pinion gear; and a second rack gear formed on one side of the support plate and configured to engage with the second pinion gear.

The apparatus may further include a return spring disposed at an end of the power generation member and configured to provide an elastic force for moving the power generation member in a substantially vertical motion.

The support plate may be configured to slide out of the guide groove so as to protrude from a lower portion of the foot module that comes into close proximity to the ground when the foot module is in contact with the ground.

The support plate may be configured to slide out of the guide groove so as to protrude from a side of the foot module.

BRIEF DESCRIPTION OF THE DRAWINGS

The above and other features of the present invention will now be described in detail with reference to certain exemplary embodiments which are illustrated in the accompanying drawings and are described by way of illustration only, and thus are not limitative of the scope of the present invention, and wherein.

It should be understood that the appended drawings are not necessarily to scale, and present a simplified representation of various features illustrative of the basic principles of the invention. The specific design features of the present invention as disclosed herein, including, for example, specific dimensions, orientations, locations, and shapes, will be determined in part by the particular intended application and use environment of the invention.

DETAILED DESCRIPTION

Exemplary embodiments of the present invention are described hereafter in detail with reference to the accompanying drawings.

Figure 1:
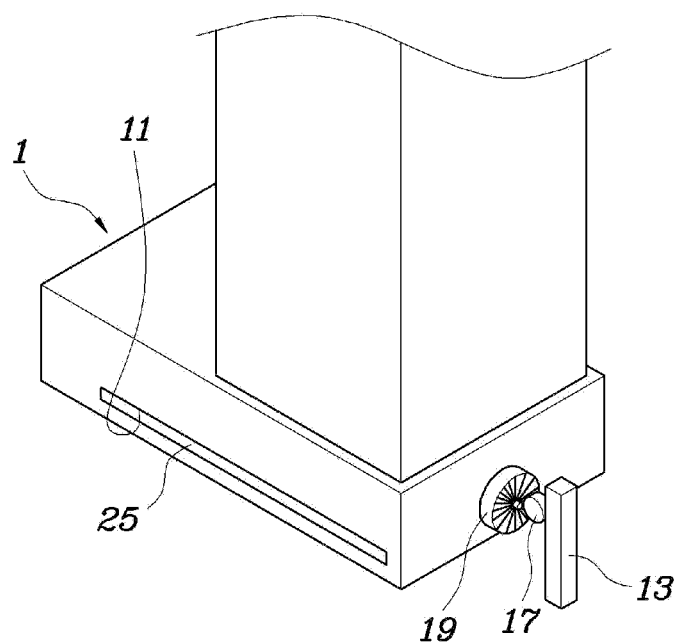
FIG. 1 is a perspective view showing the external configuration of an apparatus for a variable supporting foot of a robot according to the present invention.
Figure 2:
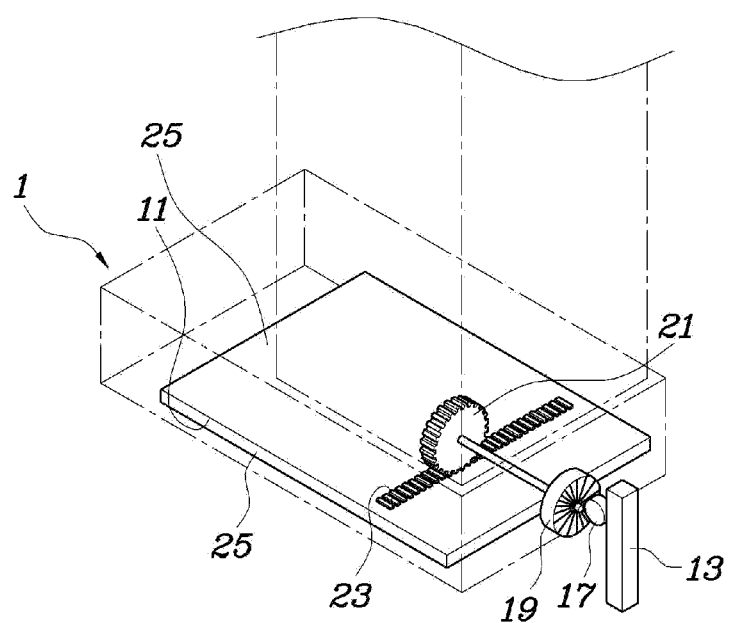
FIG. 2 is a view illustrating the internal structure of an apparatus for a variable supporting foot of a robot including a power conversion unit.
Figure 3:
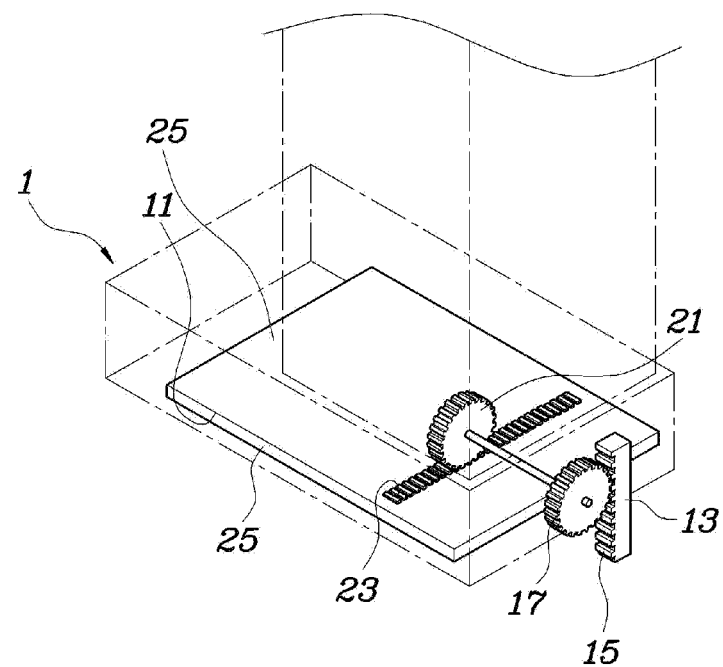
FIG. 3 is a view illustrating the internal structure of an apparatus for a variable supporting foot of a robot including another power conversion unit.
Figure 4:
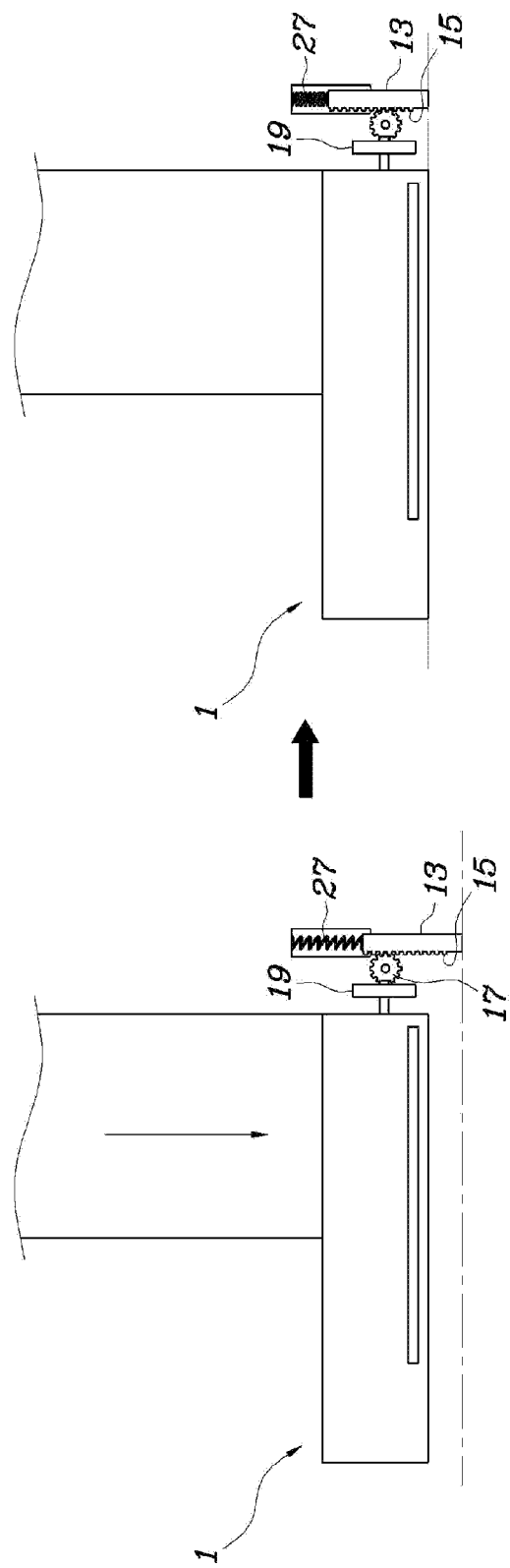
FIG. 4 is a view illustrating the functioning of a power generation structure of an apparatus for a variable supporting foot of a robot including a power conversion unit.

FIG. 1 is a perspective view showing the external configuration of an apparatus for a variable supporting foot of a robot according to the present invention, FIG. 2 is a view illustrating the internal structure of an apparatus for a variable supporting foot of a robot including a power conversion unit, FIG. 3 is a view illustrating the internal structure of an apparatus for a variable supporting foot of a robot including another power conversion unit, and FIG. 4 is a view illustrating the functioning of a power generation structure of an apparatus for a variable supporting foot of a robot including a power conversion unit.

An apparatus for a variable supporting foot of a robot according to the present invention includes a guide groove 11, a support plate 25, a power conversion unit, and a power generation member 13, as shown in FIG. 1.

Describing the present invention in detail with reference to FIG. 1, the apparatus for a variable supporting foot of a robot may include: a guide groove 11 that is formed in a foot module 1 of a robot and having an open end; a support plate 25 that is disposed in the guide groove 11 and can slide out of the guide groove 11; a power conversion unit having one end connected to the support plate 25; and a power generation member 13 connected to the other end of the power conversion unit. The power generation member 13 includes a first portion that extends below a lower surface of the foot module 1, and the power generation member 13 is configured to generate a driving force when the first portion comes into contact with the ground as the lower surface of the foot module 1 approaches and itself comes into contact with the ground.

Further referring FIG. 2, the end of the guide groove 11 formed in the foot module 1 of the robot may be open to a side of the foot module 1 (e.g., open to a side surface of the foot module 1, such as a side surface that is designed not to contact the ground during normal operation of the foot module 1). The guide groove 11 is formed in a lower portion of the foot module 1, so that the guide groove 11 comes into close proximity to the ground when the foot module 1 steps on or contacts the ground.

The support plate 25 disposed in the guide groove 11 may slide in and out of the guide groove 11. In particular, the support plate 25 is configured to slide out of the guide groove 11 as the foot module 1 approaches the ground.

Since the guide groove 11 is formed in the lower portion of the foot module 1, as the foot module comes into close proximity to or steps on the ground, the support plate 25 slides out of the guide groove 11 and can itself be supported on or otherwise come into contact with the ground. Further, since the side groove 11 is open to a side of the foot module 1, the sliding out of support plate 25 such that the support plate 25 comes into contact with the ground increases the surface area supporting the foot module 1. The increase in surface contact can help prevent the foot module 1 and/or the robot from falling down to a side by preventing the robot from sliding out from the side of the foot module 1 when the foot module 1 steps on the ground.

The power conversion unit has one end connected to the support plate 25 and the other end connected to the power generation member 13, and is configured to transmit a driving force generated by the power generation member 13 to the support plate 25. The power conversion unit causes the support plate 25 to slide straight out of the guide groove 11 by converting the driving force generated by the power generation member 13 into a rotational motion or a straight motion.

The power generation member 13 is connected to the other end of the power conversion unit. As the foot module 1 comes into proximity of the ground, the first portion of the power generation member 13 that extends below a lower surface of the foot module 1 comes into contact with the ground. As the foot module 1 further approaches the ground, the ground pushes on the first portion of the power generation member 13 thereby causing the power generation member 13 to produce a driving force. The power generation member 13 thus produces a driving force starting when the first portion first contacts the ground and until the foot module 1 fully steps on (or comes into contact with) the ground.

Referring to FIG. 4, between a time when the power generation member 13 first contacts and becomes supported by the ground (as shown in the drawing at the left side of FIG. 4) and a time when the foot module 1 comes into contact with and is fully supported by the ground (as shown in the grind at the right side of FIG. 4), the power generation member 13 moves upward relative to the foot module 1. The power generation member moves upward a distance equal to the movement distance of the foot module 1 during the same time interval. Therefore, as the power generation member 13 moves upwards, a first rack gear 15 of the power generation member 13 rotates a first pinion gear 17, thereby producing power.

A return spring 27 is disposed at an end of the power generation member 13 opposite to the first portion, and provides an elastic force opposite to the upward movement of the power generation member 13. As a result, when the foot module 1 lifts off of the ground (e.g., as shown in the drawing at the left side of FIG. 4) from a state in which the foot module 1 was in contact with the ground (e.g., as shown in the drawing at the right side of FIG. 4), the power generation member 13 is pushed downwards by the elastic force of the return spring 27, thereby causing the power generation member 13 to return to a position in which the first portion of the power generation member 13 extends below a lower surface of the foot module 1.

FIG. 2 shows a configuration of the power conversion unit according to one embodiment in which the power conversion unit includes a first rack gear, a first pinion gear 17, a face gear 19, a second pinion gear 21 rotationally connected through an axis to the face gear 19, and a second rack gear 23. The first rack gear is formed on one side of a power generation member 13 that is configured to move in a substantially straight vertical reciprocating motion. The first pinion gear 17 engages with the first rack gear, and converts the straight vertical reciprocating motion of the power generation member 13 into a rotational motion. The face gear 19 engages with the first pinion gear 17 and changes the axis of the rotation motion to an axis perpendicular to the axis of the first pinion gear 17. The second pinion gear 21 is disposed coaxially with the face gear 19, and is connected to the face gear 19 such that rotation of the face gear 19 causes the second pinion gear 21 to rotate. The second rack gear 23 is formed on one side of the support plate 25 to engage with the second pinion gear 21, so as to cause the support plate 25 to move laterally when the second pinion gear 21, the face gear 19, and/or the first pinion gear 17 rotate.

When the first portion of the power generation member 13 is pushed by the ground while the foot module 1 approaches and steps on the ground, the foot module 1 moves down relative to the power generation member 13 and the first pinion gear 17 engaging with the first rack gear of the power generation member 13 is rotated. Accordingly, the face gear 19 engaging with the first pinion gear 17 rotates, and the second pinion gear 21 disposed coaxially with the face gear 19 correspondingly rotates. Since the second pinion gear 21 is itself engaged with the rack gear 23 formed on a top of the support plate 25, the support plate 25 slides out of the guide groove 11 and extends outward from the foot module 1 in response to the second pinion gear's 21 rotation.

FIG. 3 shows a second configuration of the power conversion unit according to another embodiment in which the power conversion unit includes a first rack gear 15, a first pinion gear 17, a second pinion gear 21 rotationally connected through an axis to the first pinion gear 17, and a second rack gear 23. The first rack gear 15 is formed on one side of the power generation member 13 that is configured to move in a straight vertical reciprocating motion. The first pinion gear 17 engages with the first rack gear 15 and converts the straight vertical reciprocating motion of the power generation member 13 into a rotational motion. The second pinion gear 21 is disposed coaxially with the first pinion gear 17, and is connected to the first pinion gear 17 such that rotation of the first pinion gear 17 causes the second pinion gear 21 to rotate. The second rack gear 23 is formed on one side of the support plate 25 to engage with the second pinion gear 21, so as to cause the support plate 25 to move laterally when the second pinion gear 21 and/or the first pinion gear 17 rotate.

When the first portion of the power generation member 13 (located at a lower end of the power generation member 13) is pushed by the ground while the foot module 1 approaches and steps on the ground, the foot module 1 moves down relative to the power generation member 13 and the first pinion gear 17 engaging with the first rack gear 15 of the power generation member 13 is rotated.

Accordingly, the second pinion gear 21 disposed coaxially with the first pinion gear 17 correspondingly rotates. Since the second pinion gear 21 is itself engaged with the rack gear 23 formed on the top of the support plate 25, the support plate 25 slides out of the guide groove 11 and extends outward from the foot module 1 in response to the second pinion gear's 21 rotation.

According to the configuration of the present invention described above, when the foot module 1 of a robot steps on the ground, the support plate 25 is drawn out from a side of the foot module 1 by mechanical power produced by a power generation member 13 of the foot module 1 without requiring any external power supply. As a result of support plate 25 being drawn out from the foot module 1, the support plate 25 cones into contact with the ground. Thus, the surface area of the foot module 1 that is in contact with the ground is increased, thereby providing additional support to the foot module 1 of the robot. The added support can help prevent the robot from falling down due to rolling or pitching, and thus helps to increase the dynamic stability of the robot.

According to the present invention, when the foot module of a robot steps on the ground, the support plate is drawn out from a side of the foot module and comes to be supported on the ground. The support plate is drawn out by power produced by the power generation member of the foot module without necessitating any external power supply. Therefore, the surface area of the foot module supporting the robot, including both the surface area of a lower surface of the foot module that is in contact with the ground and a surface area of the support plate that is extended outwards from the foot module and is thus in contact with the ground, increases. The increase in surface area in contact with the ground helps to prevent the robot from falling down by rolling or pitching sideways and thus increases stability of the robot.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for variably supporting a foot of a robot comprising:
   a foot module for the foot of the robot, the foot module having a guide groove formed therein with an open end;
   a support plate disposed in the guide groove and configured to slide out of the open end of the guide groove;
   a power conversion unit having one end connected to the support plate; and
   a power generation member connected to the other end of the power conversion unit,
   wherein a portion of the power generation member extends lower than a lower surface of the foot module and is configured to cause the power generation member to generate a driving force as the foot module approaches a ground, and
   wherein the driving force generated by the power generation member is converted into a rotational motion and is transmitted to the support plate by the power conversion unit to cause the support plate to slide out of the guide groove of the foot module, and
   wherein the power conversion unit comprises:
   a first rack gear formed on one side of the power generation member that is configured to move in a substantially vertical reciprocating motion;
   a first pinion gear engaged with the first rack gear and configured to convert the substantially vertical reciprocating motion of the power generation member into a rotational motion;
   a face gear engaged with the first pinion gear and configured to change an axis of the rotational motion to an axis perpendicular to the axis of the first pinion gear;
   a second pinion gear disposed coaxially with and rotationally connected to the face gear; and
   a second rack gear formed on one side of the support plate and configured to engage with the second pinion gear.

2. The apparatus of claim 1, further comprising:
   a return spring disposed at an end of the power generation member and configured to provide an elastic force for moving the power generation member in a substantially vertical motion.

3. The apparatus of claim 1, wherein the support plate is configured to slide out of the guide groove so as to protrude from a lower portion of the foot module that comes into close proximity to the ground when the foot module is in contact with the ground.

4. The apparatus of claim 1, wherein the support plate is configured to slide out of the guide groove so as to protrude from a side of the foot module.

5. An apparatus for variably supporting a foot of a robot comprising:
   a foot module for the foot of the robot, the foot module having a guide groove formed therein with an open end;
   a support plate disposed in the guide groove and configured to slide out of the open end of the guide groove;
   a power conversion unit having one end connected to the support plate; and a power generation member connected to the other end of the power conversion unit, wherein a portion of the power generation member extends lower than a lower surface of the foot module and is configured to cause the power generation member to generate a driving force as the foot module approaches a ground, and wherein the driving force generated by the power generation member is converted into a rotational motion and is transmitted to the support plate by the power conversion unit to cause the support plate to slide out of the guide groove of the foot module, and wherein the power conversion unit comprises:

a first rack gear formed on one side of the power generation member that is configured to move in a substantially vertical reciprocating motion;

a first pinion gear engaged with the first rack gear and configured to convert the substantially vertical reciprocating motion of the power generation member into a rotational motion;

a second pinion gear disposed coaxially with and rotationally connected to the first pinion gear; and a second rack gear formed on one side of the support plate and configured to engage with the second pinion gear.

6. The apparatus of claim 5, further comprising:

a return spring disposed at an end of the power generation member and configured to provide an elastic force for moving the power generation member in a substantially vertical motion.

7. The apparatus of claim 5, wherein the support plate is configured to slide out of the guide groove so as to protrude from a lower portion of the foot module that comes into close proximity to the ground when the foot module is in contact with the ground.

8. The apparatus of claim 5, wherein the support plate is configured to slide out of the guide groove so as to protrude from a side of the foot module.

* * * * *